United States Patent [19]
Grogan et al.

[11] Patent Number: 5,143,949
[45] Date of Patent: Sep. 1, 1992

[54] AQUEOUS BASED, STRIPPABLE COATING COMPOSITION AND METHOD

[75] Inventors: George W. Grogan; Robert H. Boyd, both of Dallas, Tex.

[73] Assignee: Groco Specialty Coatings Company, Dallas, Tex.

[21] Appl. No.: 800,694

[22] Filed: Dec. 2, 1991

Related U.S. Application Data

[63] Continuation of Ser. No. 523,228, May 14, 1990, abandoned, which is a continuation-in-part of Ser. No. 299,632, Jan. 23, 1989, abandoned.

[51] Int. Cl.$^5$ .................... C08L 19/02; C08L 29/04; C08L 1/28
[52] U.S. Cl. ...................... 523/334; 524/44; 524/297; 524/317; 524/386; 524/388; 427/154; 427/155; 427/156; 106/163.1; 106/170
[58] Field of Search .............. 524/30, 44, 800, 801, 524/802, 803, 297, 386, 388, 317; 427/154, 155, 156; 106/163.1, 170; 523/334

[56] References Cited

U.S. PATENT DOCUMENTS

| | | | |
|---|---|---|---|
| 2,978,372 | 4/1961 | Bergstedt et al. | 524/44 |
| 4,064,092 | 12/1977 | Burroway et al. | 260/29.6 PM |
| 4,139,514 | 2/1979 | Bassett | 524/831 |
| 4,562,226 | 12/1985 | Coombes et al. | 524/831 |
| 4,632,847 | 12/1986 | Lomasney et al. | 427/154 |
| 4,636,543 | 1/1987 | Helton | 524/109 |
| 4,731,402 | 3/1988 | Penzel et al. | 524/831 |

*Primary Examiner*—Thurman K. Page
*Assistant Examiner*—G. S. Kishore
*Attorney, Agent, or Firm*—Charles D. Gunter, Jr.

[57] ABSTRACT

A strippable coating composition is shown for use as a temporary protective coating on a variety of substrates. The composition includes a water based polymeric emulsion which is dispersed in an aqueous carrier to form a stable emulsion. Release aids are incorporated in the composition which allow the protective coating to be removed by peeling or washing off with water.

2 Claims, No Drawings

AQUEOUS BASED, STRIPPABLE COATING COMPOSITION AND METHOD

This application is a continuation of application Ser. No. 07/523,228, filed May 14, 1990, now abandoned, which is a continuation-in-part of application Ser. No. 07/299,632, filed Jan. 23, 1989, now abandoned, entitled "Polymeric Aqueous Composition for Protective Coatings" by George W. Grogan and Robert H. Boyd.

BACKGROUND OF THE INVENTION

1. Field of the Invention

This invention relates generally to protective coatings and, more specifically, to an aqueous based, strippable coating which forms a temporary, protective layer on a variety of substrates including metal, glass, concrete, natural and synthetic elastomers and various other porous, non-porous and painted substrates and which is easily peeled or washed from the substrate.

2. Description of the Prior Art

A demand exists at the present time for a coating composition suitable for the temporary protection of the surface of an article through the deposition on the surface of a coating which can subsequently be easily removed. For example, in the case of painted or polished metal manufactured articles, such as automobiles, a need exists for such a coating composition to protect the automobile against weathering, contamination from the atmosphere, chemical attack or accidental damage during handling, storage and transit. Preferably, the coating composition is easily removed later without deleterious effect upon the surface in question. Such a composition would be especially advantageous in the case of automobiles, where a newly completed vehicle may have to be stored out of doors for a period of time and then be driven or transported to another location. The effects of sunlight, atmospheric contamination and weathering can result in a significant loss of retail value of a vehicle which has never left the dealer's lot.

One early attempt to remedy this problem was the use of a wax coating on the automobile body. Wax provides a weatherproof and, to some extent, damage-resistant layer. However, the application of wax can be time consuming and difficult and its removal typically requires the use of an organic solvent.

Environmental, health and safety concerns have emphasized the need for a water based, strippable coating which forms a temporary protective layer on a variety of substrates, yet which is quickly and easily removed without the use of organic solvents. Ideally, such a coating composition is compatible with increasing government restrictions imposed on the user on the amounts and types of organic volatiles permitted to escape to the atmosphere.

A need also exists in the construction area for a temporary, strippable coating which is easily applied and easily removed. For instance, new windows need to be protected prior and during installation. Prior art attempts to provide a solution have included such substances as vegetable shortening and peanut oil. However, in many cases, the coating composition was more difficult to remove than the paint, mortar, texture, or other substance that may have splashed, dropped or otherwise deposited onto the window surface.

It is an object of the present invention to provide an aqueous based, strippable coating composition capable of providing temporary protection to a target substrate and yet having the desired release characteristics for facilitating cleanup operations.

Another object of the present invention is to provide such a coating composition which is mechanically peelable or strippable as well as being water strippable.

Another object of the invention is to provide an aqueous based, strippable coating composition which is more environmentally acceptable than are the currently available strippable coatings.

The strippable coating composition of the invention comprises a unique blend of non-volatile, film forming components which are dispersed in an aqueous base containing selected volatile components. Evaporation of the volatile components results in the deposition of a clear, temporary protective coating for temporarily protecting various substrates against damage from environmental effects. The coating is quickly and easily released from the substrate by peeling or washing off with water. The strippable coating composition can conveniently comprise:

a blend of non-volatile components comprising about 41–71% by weight of the coating composition, including:
  about 34–54% by weight resin component;
  about 7–15% by weight release aids;
  about 0.1–0.6% by weight wetting aids;
  about 0.1–0.6% by weight defoamer;
  about 0.1–0.8% by weight dispersing aids; and
  about 1–5% by weight thickeners;

the strippable coating composition also comprising about 29–59% by weight of the coating composition of volatile components, including:
  about 0.1–2.5% by weight plasticizers and coalescents; and
  about 28.9–56.5% by weight water.

Additional objects, features and advantages will be apparent in the written description which follows.

DETAILED DESCRIPTION OF THE INVENTION

In the preferred embodiment of the present invention, water forms the aqueous vehicle or carrier for the other ingredients of the strippable coating composition. A resin component, or mixture of resin components, are incorporated into the aqueous vehicle and are dispersed by means of a unique combination of additives to produce a stable polymeric emulsion or dispersion. This dispersion can easily be applied to a target substrate by spraying, brushing or rolling. Selected volatile components, in addition to the water in the carrier, evaporate upon application of the coating composition to a substrate and leave behind a clear film which offers a temporary protective coating for the treated substrate. A unique combination of release aids incorporated into the inventive composition allow the coating to be subsequently peeled or washed off. A particularly preferred strippable coating composition of the invention comprises:

a blend of non-volatile components comprising about 41–71% by weight of the coating composition, including:
  about 34–54% by weight resin component;
  about 7–15% by weight release aids;
  about 0.1–0.6% by weight wetting aids;
  about 0.1–0.6% by weight defoamer;
  about 0.1–0.8% by weight dispersing aids; and
  about 1–5% by weight thickeners;

the strippable coating composition also comprising about 29-59% by weight of the coating composition of volatile components, including:

about 0.1-2.5% by weight plasticizers and coalescents; and about 28.9-56.5% by weight water.

The resin component of the composition includes a polymeric material which is compatible with the aqueous vehicle or carrier. Three general types of polymers are commonly employed in aqueous based systems such as the present. These include the soluble, semi-soluble and latex polymers. The soluble polymers are characterized by clear solutions, whose viscosity depends on the molecular weight of the resins. They are generally made in solution and diluted with water to achieve the desired viscosity for proper application. The latexes are opaque suspensions of polymer particles, generally less than one micron in size. The viscosity of the latex is dependent on particle packing rather than on molecular weight and, as a consequence, a combination of high molecular weight and low viscosity at relatively high solids can readily be obtained. The semi-solubles, also called colloidal dispersions, are translucent in appearance and are generally characterized by properties intermediate the solubles and latexes.

Polymers which fall within the above general description include poly(vinyl acetates), poly(vinyl formal), poly(vinyl butyral), poly(vinyl chloride), poly(vinyl chloride-vinyl acetate)copolymers, poly(vinylidene) copolymers and poly(vinylidene chloride-vinyl chloride) copolymers. The preferred polymers useful for purposes of the present invention can be produced as latexes by emulsion polymerization processes using known catalysts and chain transfer agents, as will be familiar to skilled in the art. A straight vinyl acetate homopolymer or copolymer emulsion can be employed. A preferred resin component is the vinyl acetate homopolymer and copolymer emulsion in water sold by Air Products and Chemicals, Inc. of Allentown, Pa., as FLEXBOND 325 emulsion. This product is described in the literature as a stable emulsion of small polymer particles in water having a solids content of 45-65% by weight, a boiling point of 100° C., a density of 9 lbs/gal, pH of 4-9.5 and a specific gravity of 1.1. The resin component of the strippable coating composition is preferably present in the range from about 34-54% by weight, based on the total weight of the strippable coating composition.

The resin component is blended with selected dispersing aids and wetting aids and with selected plasticizers and coalescents in order to produce a stable polymeric emulsion. The wetting and dispersing aids are selected from those conventionally employed to emulsify an aqueous polymer composition. Known surfactants of this general type include anionic, and/or non-ionic, and/or cationic surfactants, depending upon the particular resin component selected for use in the aqueous carrier vehicle. Known anioinic surface active agents include, for example, sodium oleate, potassium oleate and other metal salts of fatty acids; alkylbenzene sulfonates such as sodium dodecylbenzene sulfonate; sulfuric acid esters of higher alcohols such as sodium lauryl sulfate and ammonium lauryl sulfate, sodium alkyl sulfates and sulfonates including, e.g., sodium dodecyl sulfonate. Non-ionic surfactants include, e.g., polyoxyethylene alkylaryl ethers such as polyoxyethylene nonylphenyl ether and polyoxyethylene octylphenyl ether.

Preferred wetting agents include the nonylphenol polyethylene glycol ether sold by Union Carbide Corporation as TERGITOL NP-9. This agent is described in the literature as having a molecular weight of 616, specific gravity of 1.057 at 20°/20° C. and a freezing point of 0° C. Also included are the octylphenoxypolyethoxyethanol sold by Rohm and Hass Company as the TRITON X-100 non-ionic surfactant.

Preferred dispersing agents include the TAMOL 850 Dispersing Agent sold by Rohm and Hass Company which is the sodium salt of polymeric carboxylic acid having a viscosity of 325 cps, a vapor pressure of 17 mm Hg@20° C./68° F., and a specific gravity of 1.0-1.2 (water=1), 23 and the dioctyl sodium sulfosuccinate anionic surfactant sold by Rohm and Hass Company as TRITON GR-7M surfactant.

Another useful wetting and dispersing aid is the phosphate ester sold by Dexter Chemical Company of Bronx, N.Y., as STRODEX PK-90. It is described as having a boiling point of 212° F. and a specific gravity of 1.15.

The wetting aids are preferably present in the range from about 0.1-0.6% by weight and the dispersants are preferably present in the range from about 0.1-0.8% by weight of the strippable coating composition.

Typically, the inventive composition will also include a companion antifoam agent or agents which are compatible with the selected surfactants. The antifoam agents include a wide variety of commercially available materials. Examples include various dispersions such as reacted silica in mineral oil or silicone based materials. A preferred antifoam agent is sold by BYK Chemical of Wallington, Conn., as BYK-035. This material is described as a mixture of hydrophobic components in paraffin based mineral oil.

The preferred plasticizers and coalescents include, for example, glycerine, dibutyl phthalate, and 2,2,4-trimethyl-1,3-pentanediol monoisobutyrate sold by Eastman Chemical Products, Inc., Kingsport, Tenn. as TEXANOL Ester Alcohol. This product is described as having a molecular weight of 216.32, a boiling point of 244° C., and a specific gravity of 0.95 at 20°/20° C. The plasticizers and coalescents are preferably present in the range from about 0.1-2.5% by weight of the strippable composition.

Release aids are preferably present in the range from about 7-15% by weight of the strippable composition. The release aids are present in an amount to insure easy removal of the coating from the substrate once the coating has dried. Known release agents for use in aqueous polymeric emulsions include silicon polymers, unsaturated fatty acid-monoamides such as oleic acid monoamide, fatty bisamides, polyethylene glycol monostearate, petrolatum, sodium alkyl benzene sulfonates, synthetic waxes including low molecular weight polyethylene waxes, and the like.

Preferably, the resin component and additional chemical additives previously discussed are dispersed to form a stable emulsion by blending the above components with a colloidal mixture of paraffin waxes, polymeric waxes, fatty oils, and the like, which also serve the composition as release agents and impose a high resistance to water. A particularly preferred wax is the paraffin wax emulsion sold by Michelman, Inc., of Cincinnati, Oh., as MICHEM LUBE 135, having a boiling point of 212° F. and a specific gravity of 1. The addition of polyvinyl alcohol to this paraffin wax emulsion has proved to be particularly effective in forming the stable emulsion and subsequently acting as release aids. A weight ratio of polyvinyl alcohol/paraffin wax emulsion of about 1:1 to 2:1, most preferably about 1.25:1 has proved to be particularly effective. The stable emulsion which results can be applied to a target substrate to form a protective coating and yet can be stripped away mechanically or with a water spray. The paraffin wax emulsion and polyvinyl alcohol blend allows the resin components to be re-wet after application to facilitate the stripping operation. The dried film itself acts as a barrier to protect the release agents. Sample coatings applied to metal test panels and dried in an oven at 120° for 30 minutes form a film which is mechanically strippable or strippable with water spray as long as one year, or more, after application.

The inventive coating composition can also contain thickeners in the range from about 1-5% by weight of strippable composition. The thickeners are used to control application properties of the resin component. Various thickeners include protein thickeners such as hydroxyethylcellulose, acrylic polymers such as sodium polyacrylate, and polyacrylic acid, polysaccharides, fumed silicas, and expanded clays. A preferred thickener is hydroxyethylcellulose, which is available from a number of commercial sources.

A microbiocide is typically employed with the aqueous emulsion polymer to allow it to be stored in can form for prolonged periods of time. A preferred microbiocide is 1,2-dibromo-2,4-dicyanobutane available from Calgon Corporation as TEKTAMER 38D.

It is also important that the combined resin component and chemical additive system be approximately neutralized in pH. This can conveniently be accomplished by the addition of a pH adjusting agent such as 2-amino-2-methyl-1-propanol.

The following examples are presented to illustrate the claimed invention and are not intended to be otherwise limiting:

EXAMPLE 1

In its general form, the strippable coating composition of the invention comprises:

| COMPONENT | Weight % |
| --- | --- |
| DEFOAMERS | 0.1–0.6 |
| WETTING AIDS | 0.1–0.6 |
| DISPERSING AIDS | 0.1–0.8 |
| PLASTICIZERS and COALESCENTS | 0.1–2.5 |
| RELEASE AIDS | 7.0–15.0 |
| RESIN COMPONENT | 34.0–54.0 |
| THICKENERS | 1.0–5.0 |
| WATER | Balance |

Water and resin can be used to complete a 100% composition.

EXAMPLE II

A particularly preferred strippable coating composition, useful in protecting vehicle exteriors can be formulated as follows:

STEP ONE

Charge the following components to a blending tank:

| COMPONENT | GALLONS | POUNDS |
| --- | --- | --- |
| Polyvinyl Acetate Emulsion[1] | 43.96 | 400.00 |
| DEFOAMER[2] | 0.41 | 3.00 |
| 2,2,4 trimethyl-1,3-pentanediol mono isobutyrate | 0.38 | 3.00 |
| Nonylphenol polyethylene glycol ether | 0.22 | 2.00 |
| Phosphate ester[3] | 0.73 | 8.00 |
| Dipropylene glycol dibenzoate | 1.38 | 13.00 |
| 1,2-Dibromo-2,4-dicyanobutane | 0.19 | 1.50 |
| 2-Amino-2-methyl-1-propanol | 0.25 | 2.00 |
| Water | 1.56 | 13.00 |

STEP TWO

Add the following components under slow agitation, one component at the time:

| COMPONENT | GALLONS | POUNDS |
| --- | --- | --- |
| Polyvinyl alcohol[4] | 5.79 | 50.00 |
| Paraffin Wax Emulsion[5] | 5.00 | 40.00 |
| Polyvinyl Acetate Emulsion[1] | 43.96 | 400.00 |

The order of mixing the above components has been found to be critical in producing a stable emulsion which can subsequently be peeled or washed from the target substrate.
1. FLEXBOND 325
2. BYK-035
3. STRODEX PK-90
4. VINOL 205
5. MICHEM LUBE 135

The strippable coating composition can be applied by any number of conventional techniques including spraying, brushing, or dip application depending upon the substrate to be protected. In the case of vehicle coatings, a dry film thickness in the range from about 1.0 to 10 mils, preferably about 1.5 to 5.0 mils has been found to work satisfactorily. Drying time can be shortened to a matter of minutes by using a source of infrared light as an auxiliary drying technique.

A coating composition as described in the above examples was tested as follows:

96 HOUR HUMIDITY

A number of auto OEM black painted panels were tested. Three-fourths of the surface area of the panels were coated with the composition of the invention and allowed to flash dry for thirty (30) minutes. The panels were then dried in a 120° F. oven. The top one-fourth of each panel was left unprotected. The panels were taped with a 3M PSA black tape on the backside and around three (3) edges to protect the uncoated metal. The panels were placed in a humidity cabinet and tested for ninety-six (96) hours in accordance with ASTM 2247. After the tape was removed from the edges to free the film, the bottom half of the film was peeled away from the panel and inspected for any degradation of the coating or paint film. An isopropyl alcohol and soap solution was used on the bottom portion of the panel, where the strippable coating was peeled back and cut, to remove any tape residue and then polished with a soft cloth. After ninety-six (96) hours in the humidity cabinet there was no apparent change in the peelable coating, with no blistering or peeling observed.

ENVIRONMENTAL CYCLING

A second set of test panels were coated as before and allowed to flash dry for thirty (30) minutes. The panels were then dried in a 120° F. oven. The top one-fourth of each panel was left unprotected. The panels were taped with a 3M PSA black tape on the backside and around the edges to protect the uncoated metal. In accordance with test method 9505P, the panels were placed in a 176° F. oven for sixteen (16) hours, humidity cabinet for twenty-four (24) hours, and then in a −22° F. cold box for eight (8) hours. This cycle was repeated five (5) times. The panels were checked for any film degradation. The tape was cut along the edges to free the film. The removed portion of coating and the paint film was inspected for any degradation. An isopropyl alcohol and soap solution was used on the top one-fourth and the bottom portion of the panels, where the Transseal was peeled back and cut, to remove any tape residue and then polished with a soft cloth. After a total of two hundred forty (240) hours, representing heat, humidity and extreme cold, there was no visible sign of degradation to the strippable coating or the paint film. The panels show a mark line approximately ⅛ inch from the edge where it was protected by the 3M PSA tape. The coating of the invention provided an excellent barrier to three major atmospheric elements without any degradation to the paint film.

RUST-IRON/HUMIDITY PROTECTION

A third set of panels were coated and dried as before. The top one-fourth of the panels were left unprotected. The panels were taped with a 3M PSA black tape on the backside and around three (3) edges to protect the uncoated metal. Iron shavings were sprinkled over the coated and uncoated areas of each panel. Acid Rain of 0.001N was sprayed on the iron shavings. All six (6) panels were placed in a 180° F. oven in a horizontal position for twenty-four (24) hours. Following the bake cycle the panels were placed in a humidity cabinet, staying in a horizontal position for twenty-four (24) hours. Following the humidity cycle the iron shavings were again sprayed with 0.001N Acid Rain and returned to a 180° F. oven for twenty-four (24) hours. The panels were removed from the oven and allowed to cool to room temperature. To remove excess iron shavings the uncoated area was rinsed with warm soapy water. The coated area was brushed with a soft brush to remove the excess iron shavings. The tape was cut along the edges to free the film, with the bottom half of the coating peeled back and cut. The removed portion of coating and the paint film was inspected for any degradation. An isopropyl alcohol and soap solution was used on the bottom portion of the panel, where the Transseal was peeled back and cut, to remove any tape residue and then polished with a soft cloth. After exposing the panels to iron shavings, 0.001 N Acid Rain Spray on two (2) occasions, forty-eight (48) hours in a 180° F. oven and twenty-four (24) hours in a humidity cabinet, the top one-fourth of the panel had extensive rusting where the bottom three-fourths of the panel had little evidence of rust. After using warm soapy water to remove the excess iron shavings, the uncoated painted surface still felt rough and pitted. Rust spots were very prevalent on the uncoated surface. The bottom half of the coated area peeled back easily, leaving no evidence of spotting or rusting on the painted surface. The coating of the invention was found to provide an excellent barrier to rusting and atmospheric elements.

The strippable coating of the invention provides numerous advantages. The coating is water based, allowing it to be easily removed without the use of organic solvents. It provides an effective temporary protective film against environmental effects including acid rain, as well as protecting against nicks and scratches. The temporary protective coating can be easily peeled-off in sheets or conveniently removed with a stream of water through a high pressure hose. The non-pigmented, clear film presents a pleasing appearance as well as providing temporary protection for the substrate which is being treated. The composition of the invention can be used particularly advantageously as a temporary protective coating for automobiles during shipment and storage. The temporary protective coating also greatly reduces or eliminates the use of razor blades, and abrasive cleaning agents that can scratch or break glass. By not allowing direct contact of sand, mortar and cement or other foreign materials, glass and fragile substrates can be protected during construction, thereby reducing the costly service of replacing damaged, scratched or broken glass. The composition of the invention can be applied to a variety of substrates including formica, ceramics, porcelains, marble, stainless steel, copper and aluminum.

While the invention has been shown in only one of its forms, it is not thus limited but is susceptible to various changes and modifications without departing from the spirit thereof.

We claim:

1. A clear, strippable coating composition applied as a film which when dried has a thickness in the range from about 1.5 to 5.0 mils, the strippable coating composition, comprising:
   a blend of non-volatile components comprising about 41–71% by weight of the coating composition, including:
   about 34–54% by weight polyvinyl acetate emulsion;
   about 7–15% by weight of a release agent selected from the group consisting of paraffin wax emulsion, polyvinyl alcohol and mixtures thereof;
   about 0.1–0.6% by weight non-ionic surfactant as a wetting aid;
   about 0.1–0.6% by weight defoamer;
   about 0.1–0.8% by weight dispersing aid; and
   about 1–5% by weight thickener;
   the strippable coating composition also comprising about 29–59% by weight of the coating composition of volatile components, including:
   about 0.1–2.5% by weight plasticizer the plasticizer component being selected from the group consisting of glycerine, dibutylphthalate and 2,2,4-trimethyl-1,3-pentanediol monoisobutyrate;
   about 28.9–56.5% by weight water;
   the strippable coating composition being characterized as drying to form a clear film which is strippable for up to one year by water spray.

2. A clear, strippable coating composition adapted to form a temporary protective coating for a vehicle exterior surface when applied as a film which, when dried, has a thickness in the range from about 1.5 to 5.0 mils, the strippable coating composition, comprising:
   a blend of non-volatile components comprising about 41–71% by weight of the coating composition, including:

about 34-54% by weight polyvinyl acetate emulsion;

about 7-15% by weight of a release agent which comprises a mixture of paraffin wax emulsion and polyvinyl alcohol, the weight ratio of polyvinyl alcohol to paraffin wax emulsion in the mixture being in the range from about 1:1 to about 2:1;

about 0.1-0.65 by weight non-ionic surfactant as a wetting aid, the non-ionic surfactant being a nonylphenol polyethylene glycol ether;

about 0.1!4 0.6% by weight defoamer;

about 0.1-0.8% by weight phosphate ester dispersing aid sold commercially as STRODEX PK-90, having a boiling point of 212° F. and a specific gravity of 1.15; and about 1-5% by weight hydroxyethylcellulose as a thickener;

the strippable coating composition also comprising about 29-59% by weight of the coating composition of volatile components, including:

about 0.1-2.5% by weight plasticizer, the plasticizer component being selected from the group consisting of glycerine, dibutyl phthalate, and 2,2,4-trimethyl-1,3-pentanediol monoisobutyrate; and about 28.9-56.5% by weight water;

the strippable coating composition being characterized as drying to form a clear film which is strippable for up to one year by water spray.

* * * * *